United States Patent [19]

Berrian

[11] Patent Number: 5,806,980

[45] Date of Patent: Sep. 15, 1998

[54] METHODS AND APPARATUS FOR MEASURING TEMPERATURES AT HIGH POTENTIAL

[75] Inventor: Donald W. Berrian, Topsfield, Mass.

[73] Assignee: Novellus Systems, Inc., San Jose, Calif.

[21] Appl. No.: 712,310

[22] Filed: Sep. 11, 1996

[51] Int. Cl.$^6$ .......................... G01K 7/04; G01K 13/00; G01K 1/14

[52] U.S. Cl. ........................ 374/179; 374/141; 374/152

[58] Field of Search .................................. 374/179, 141, 374/152

[56] References Cited

U.S. PATENT DOCUMENTS

| | | | |
|---|---|---|---|
| 4,483,631 | 11/1984 | Kydd | 374/179 |
| 5,273,588 | 12/1993 | Foster et al. | 118/723 E |

FOREIGN PATENT DOCUMENTS

3342580 A1  11/1983  Germany .

OTHER PUBLICATIONS

*ISA Transactions*, Elsevier Science B.V., vol. 33, No. 3, (Sep. 1994), pp. 287–292, Robert J. Rosenberg, "Temperature Measurement On The Job Site Using RTDs And Thermocouples".

*Primary Examiner*—Diego F. F. Gutierrez
*Attorney, Agent, or Firm*—Curtis A. Vock

[57] ABSTRACT

A thermocouple is provided which measures the temperatures of structures at high RF potential, such as an RF electrode within a plasma CVD or plasma etch reactor. The thermocouple includes an outer conductive sheath that connects to the RF electrode at a first location, and a wire pair, connected to a second location of the RF electrode, that is used to sense the RF electrode temperature. The sheath—or a conductive member connected in circuit with the sheath—is wound into a coil to form an inductor with an impedance much greater than the impedance of the RF electrode. A large capacitor grounds the coil so that the thermocouple wires, extending through the sheath, and through and out of the coil, are available for diagnostic purposes. While RF current flows through the sheath, the wires experience the same magnetic field generated by the inductive coil, substantially grounding the thermocouple. Preferably, signal conditioning electronics remove any remaining DC bias voltages. In the case of a reactor for plasma CVD or etch, the thermocouple can be enclosed within a vacuum-sealed RF feedthrough that conducts the RF energy to the electrode.

29 Claims, 6 Drawing Sheets

5,806,980

METHODS AND APPARATUS FOR MEASURING TEMPERATURES AT HIGH POTENTIAL

FIELD OF THE INVENTION

This invention relates to temperature sensors; and particularly relates to thermocouples for measuring the temperature of RF structures. More particularly, the invention relates to plasma chemical vapor deposition (CVD) and plasma etch; and specifically relates to apparatus which supports the monitoring and control of a plasma CVD and plasma etch reactor.

BACKGROUND OF THE INVENTION

It is well-known that the processes of plasma chemical vapor deposition, or plasma "CVD," and plasma etch occur within a reactor. One exemplary prior art reactor is described in U.S. Pat. No. 5,273,588, entitled "Semiconductor wafer processing reactor apparatus comprising contoured electrode gas directing means." Typically, the reactor of the prior art has a pair of electrodes and a radiofrequency source which, in combination, generate a discharge between the electrodes to ionize reactive gases therein. These ionized gases form a "plasma" which deposits film onto, or etches film off of, surfaces in contact with the plasma.

In plasma CVD, for example, a workpiece, e.g., a semiconductor wafer, is clamped to one of the electrodes so that selected films can be deposited onto the workpiece's surface (s) exposed to the plasma between the electrodes. Successive exposures to differing plasmas can create desirable semiconductor films on the surface, such as a bilayer of titanium and titanium-nitride. Similarly, in plasma etch, coatings or films can be removed selectively when exposed to plasmas formed by appropriate etch gases, e.g., carbon tetrafluoride.

Typically, the electrical discharges which transform the reactive gases into plasma are generated by applying differential voltages to the electrodes. These discharges are usually radiofrequency ("RF"), as generated by an alternating current ("AC") RF source connected to the electrodes. A direct current ("DC") source can also be used to create plasma by generating an ionizing "spark" within the gap between the two electrodes.

To facilitate the application of AC and/or DC voltage differentials to the electrodes, one of the electrodes is usually grounded and the other is held at radiofrequency potential, i.e., at high voltage. The workpiece can be connected, mounted or clamped to either electrode so that at least one surface of the workpiece receives the desired process of film deposition or etch. However, because it is often desirable to heat the workpiece during the plasma CVD or etch process, one of the electrodes also generally functions as a heated carrier. This additional process of controlling electrode temperatures during film deposition or etch is extremely difficult. Such control is particularly challenging in order to attain the desired accuracies of +/- two degrees, or less, for electrodes of up to seven hundred degrees Centigrade.

In addition, it is often necessary to measure the temperature of one or more of the electrodes, particularly the heated carrier, in order to effectively control the plasma CVD or plasma etch process. Further, the measurement of electrode temperature is desirable even when that electrode is at high RF potential. Such a measurement is needed, for example, to ensure that the chemical reactions within the reactor do not occur directly at the electrode's surface as a result of being too hot or too cold.

Accordingly, there is the need to directly measure the surface of the heated carrier electrode structure with a temperature sensing device such as a thermocouple. However, one problem with doing so is that it is difficult to separate the RF potential from the low voltage produced by the thermocouple. Specifically, the AC, RF electrode can have voltages of several thousand volts; while the typical thermocouple generates a voltage signal in the milli-volt range. Moreover, the thermocouple amplifiers, which are needed to provide a measurable diagnostic signal, do not generally tolerate AC currents, particularly at radiofrequencies.

The prior art has addressed the temperature sensing problem discussed above by isolating the thermocouple from the RF potentials. By way of example, the prior art has constructed thermocouple amplifiers that provide some measure of electrical isolation; but these amplifiers are generally ineffective for isolation against RF voltages, particularly without complex and expensive electronics.

The prior art has also described certain mechanical techniques used to isolate the thermocouple from RF potentials. For example, one popular technique physically insulates the thermocouple from the electrode under measurement, as illustrated in FIG. 1. In FIG. 1, a reactor 10 includes an RF electrode 12 and a second electrode 14 (shown in a dotted outline). The RF electrode 12 is connected to a radiofrequency generator 16. An RF feedthrough 18 conducts the RF energy into the reactor 10 and to the electrode 12; and the seal 20 operates to prevent leakage of reactive chemicals out through openings adjacent to the feedthrough 18.

The thermocouple 22 extends through a vacuum seal 24 to prevent leakage out of the reactor 10. The thermocouple 22 is in contact with the insulating block 26 to isolate the thermocouple from RF potentials. The thermocouple wires 22a, 22b extend through the thermocouple 22 to provide for diagnostics outside, such as through amplification by amplifier 28 and DC voltage measurement by sensor 30.

The technique illustrated in FIG. 1, however, is not effective because it negatively affects the heat transfer between the thermocouple 22 and the electrode surface 32, thereby leading to inaccuracies. Those skilled in the art appreciate that good thermal conduction is desirable when sensing temperatures with a thermocouple, particularly within a vacuum such as within the reactor 10. Nevertheless, the prior art mechanical methods of FIG. 1, for example, reduce thermal conductivity between the thermocouple 22 and the surface 32 since the desired heat transfer must pass though additional interfaces and through differing materials (i.e., the insulating block 26). This problem is compounded for temperature measurements which are less than about four hundred degrees Centigrade since radiative heat transfer does not significantly contribute to thermal conduction.

The prior art mechanical techniques thus take away from the overall desire of maintaining good thermal contact between the thermocouple and the surface under test, and reduce the likelihood of obtaining very accurate temperature measurements.

The prior art has further described isolation of the temperature sensor through optical techniques. With reference to FIG. 2, for example, the signal conditioning electronics 34 (e.g., including the amplifier 28) reside at RF potential; and the amplified output 36 is brought to ground potential through optical coupling 38, which generates an electromagnetic beam 40 that is detected by a mating coupling 42. The signal thereafter is amplified by amplifier 44 so that appropriate diagnostics can take place.

The technique of FIG. 2 is also problematic in that access to the signal conditioning electronics 34 is not feasible while the RF potential from generator 16 is "ON" since the electrical components, e.g., the amplifier 28', are at that RF potential. In addition, the optical couplings 38, 42 of FIG. 2 are complicated, awkward to package, and add significant costs to the manufacturing and control process.

It is, therefore, one object of the invention to provide thermocouple apparatus that reduces the problems associated with the prior art.

Another object of the invention is to provide a reactor which enables plasma CVD and/or plasma etch and the simultaneous measurement of the RF electrode temperature.

Yet another object of the invention is to provide methodology for measuring the temperature of mechanical structures at RF potentials and with high accuracy.

These and other objects of the invention will be apparent from the description which follows.

SUMMARY OF THE INVENTION

In one aspect, the invention provides a method for measuring the temperature of a structure at high radiofrequency potential, typically greater than about one megahertz. The thermocouple is encapsulated within an elongated conductive sheath, e.g., made of hastalloy or stainless steel material. One end of the sheath is coupled to a first location of the structure. The thermocouple has two electrically conductive paths, each with a different metal, that join at a measurement junction coupled to a second location on the structure. These paths extend through the elongated sheath to provide diagnostic access to the thermocouple at a signal end. An inductive coil is formed, in circuit with the sheath, to produce an inductance at the radiofrequency. The conductive paths are disposed inside the coil, which is then brought to ground potential by connecting the sheath to a capacitor. The temperature of the structure is thereafter determined through measuring the DC potential of the paths.

In one aspect, the method of the invention includes the step of winding a portion of the sheath into the coil.

Preferably, and other aspects, the methods of the invention include (a) the step of filtering to remove residual radiofrequency voltages; and (b) step of amplifying a signal from the paths with an isolation amplifier to remove DC bias voltages.

The invention also provides a temperature sensing system for measuring the temperature of a structure at high radiofrequency potential. A thermocouple is encapsulated within an elongated conductive sheath with a first end. That first end is coupled to a first location of the structure with an operating radiofrequency of at least one megahertz. The thermocouple has two electrically conductive paths, each with a different metal, that join at a measurement junction coupled to a second location of the structure. These paths extend through the elongated sheath to provide diagnostic access to the thermocouple at a signal end. An inductive coil is in circuit with the sheath. That coil produces an inductance at the radiofrequency and generates a magnetic field that is common to the conductive paths. Finally, a capacitor couples the coil to ground potential so that temperature sensing can be made.

Preferably, the conductive paths of the system are inside the coil. The sensor can also include a temperature sensor that determines temperature from the paths at a signal end. Typically, that sensor measures a DC voltage of the paths to make the measurement.

The invention also provides improvements to a reactor for plasma CVD or plasma etch of the type having a chamber with a pair of electrodes therein, and having a first electrode operating at ground potential, and a second electrode operating at a radiofrequency potential greater than about one megahertz. In the improvement according to the invention, a thermocouple is encapsulated within an elongated conductive sheath. The thermocouple has a first end that is coupled to a first location of the second electrode. The thermocouple further has two electrically conductive paths, each with a different metal, that join at a measurement junction coupled to a second location of the second electrode. These paths extend through the elongated sheath to provide diagnostic access to the thermocouple at a signal end. An inductive coil is in circuit with the sheath. This coil produces an inductance at the radiofrequency and generates a magnetic field that is common to the conductive paths. A capacitor thereafter couples the coil to ground potential.

These and other aspects and advantages of the invention are evident in the description which follows and in the accompanying drawings.

BRIEF DESCRIPTION OF THE DRAWINGS

A more complete understanding of the invention may be obtained by reference to the drawings, in which.

DETAILED DESCRIPTION OF THE INVENTION

Figure 3:
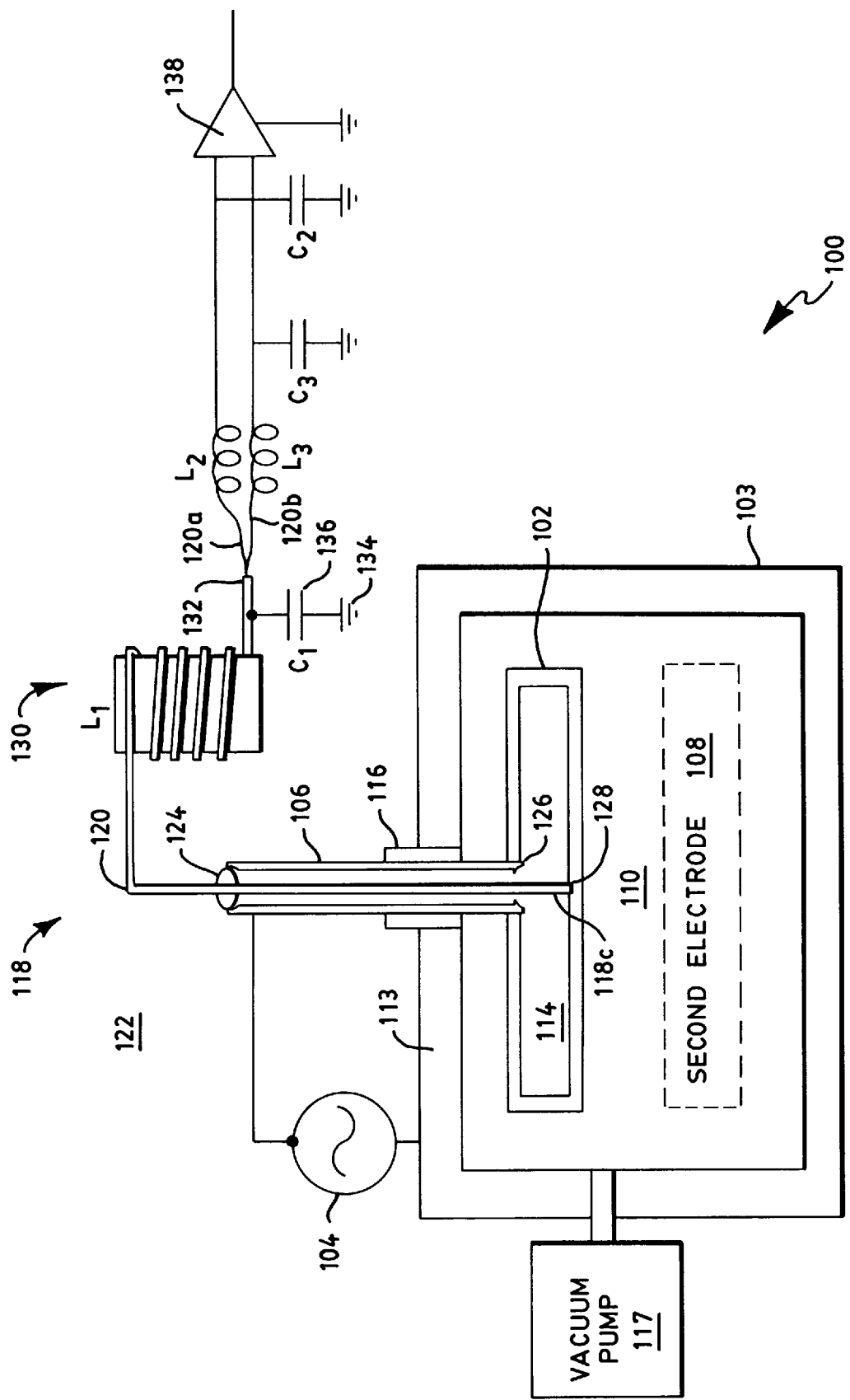
FIG. 3 illustrates a system, including a thermocouple, constructed according to the invention.

FIG. 3 illustrates a system 100 constructed according to the invention. An RF electrode 102 in a reactor chamber 103 is shown in circuit with an RF power supply 104 and an RF feedthrough 106. A second electrode 108 in the chamber 103 functions with the RF electrode 102 and source 104 to form discharges within the gap 110 to ionize gases therein. The RF feedthrough 106 is preferably sealed, pressurewise, to the reactor walls 113 by way of an insulating feedthrough 116. A vacuum pump 117 connects through the walls 113 to evacuate the chamber 103 selectively.

Figure 1:
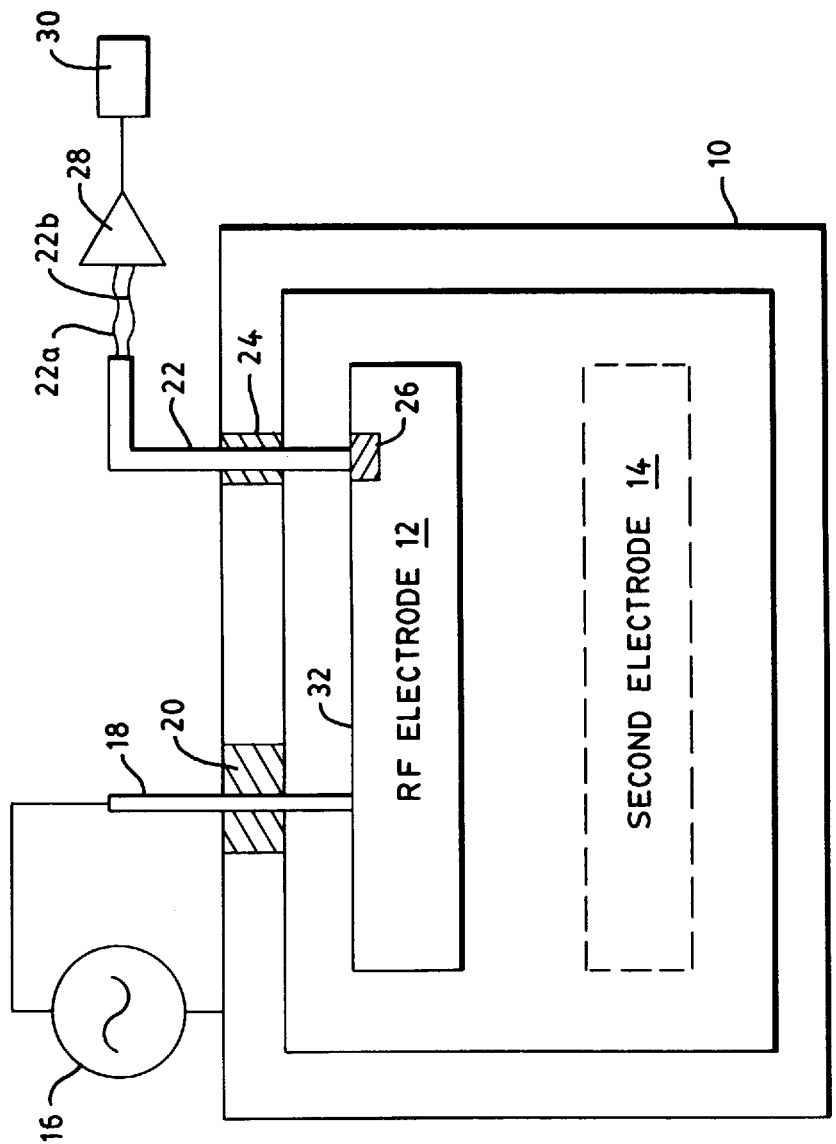
FIG. 1 illustrates one prior art system for measuring the temperatures of an RF electrode with a thermocouple and which includes a mechanical insulator to physically separate the thermocouple from the electrode.

The RF electrode 102 is shown illustratively in FIG. 1 as a "showerhead" type RF electrode, known to those skilled in the art, because of its appearance and similarity to a common bathroom showerhead. Such an electrode has in inner mixing region 114 which facilitates the mixing of gases prior to their injection into the gap 110. Nevertheless, the electrode 102 is shown for illustration purposes only. Other RF electrodes, such as illustrated by RF electrodes 12 of FIGS. 1 and 2, can be used with the invention. Moreover, the thermocouple sensing techniques of the invention can be used to measure the temperature of a variety of RF structures; and there is no requirement that such structures exist with a plasma CVD or plasma etch reactor. Rather, the temperature-sensing system 100 illustrated of FIG. 1 shows a practical application of the invention in the field of plasma CVD and plasma etch.

In the preferred embodiment of the invention, the thermocouple 118 includes a pair of wires 118a, 118b that are encased and/or sealed within a conductive sheath 120. Although not required, the sheath 120 extends through the hollow center of the feedthrough 106; and the sheath 120 is sealed to the feedthrough 106 to permit evacuation of the reactor 112 and to prohibit leakage of reactor chemicals into the air 122. Preferably, the sheath 120 is welded to one end of the feedthrough 106, such as illustrated by weld joint 124, to provide high mechanical strength and a vacuum seal.

The feedthrough 106 is connected to the RF electrode 102 at a first location 126; and the thermocouple tip 118c is attached to a second location 128 of the electrode 102. This arrangement ensures that RF energy from the source 104 travels through the surface of the feedthrough 106, and not through the sheath 120 that passes down the feedthrough's hollow center.

In one embodiment, such as illustrated in FIG. 3, the thermocouple sheath 120 is wound into coil 130 to generate an inductance $L_1$ such that the coil's impedance is relatively high at the frequency of the source 104. The end 132 of the sheath 120, emerging from the coil 130, is connected to ground potential 134 through a large capacitor 136. Together, the inductance of the coil 130 and the capacitor 136 act as a low pass filter to reduce the RF potential of the sheath 120 at the end 132. Since the thermocouple wires 120a, 120b are inside the sheath 120, and coupled to the same magnetic field as generated by the inductive coil 130, the wires 120a, 120b have low RF potential extending through the end 132. The RF currents that flow through the coil 130 and to the capacitor 136 and ground 134 pass through the sheath 120, and not through the wires 120a, 120b. Accordingly, the wires 120a, 120b are not heated by current flowing therein, increasing the sensing accuracy of the system 100.

System 100 preferably includes additional filtering with inductors $L_2$ and $L_3$ and capacitors $C_2$ and $C_3$ to remove residual RF voltages that may exist with the wires 120a, 120b; and an isolation amplifier 138 to amplify the thermocouple signal and to remove large DC bias voltages.

Figure 2:
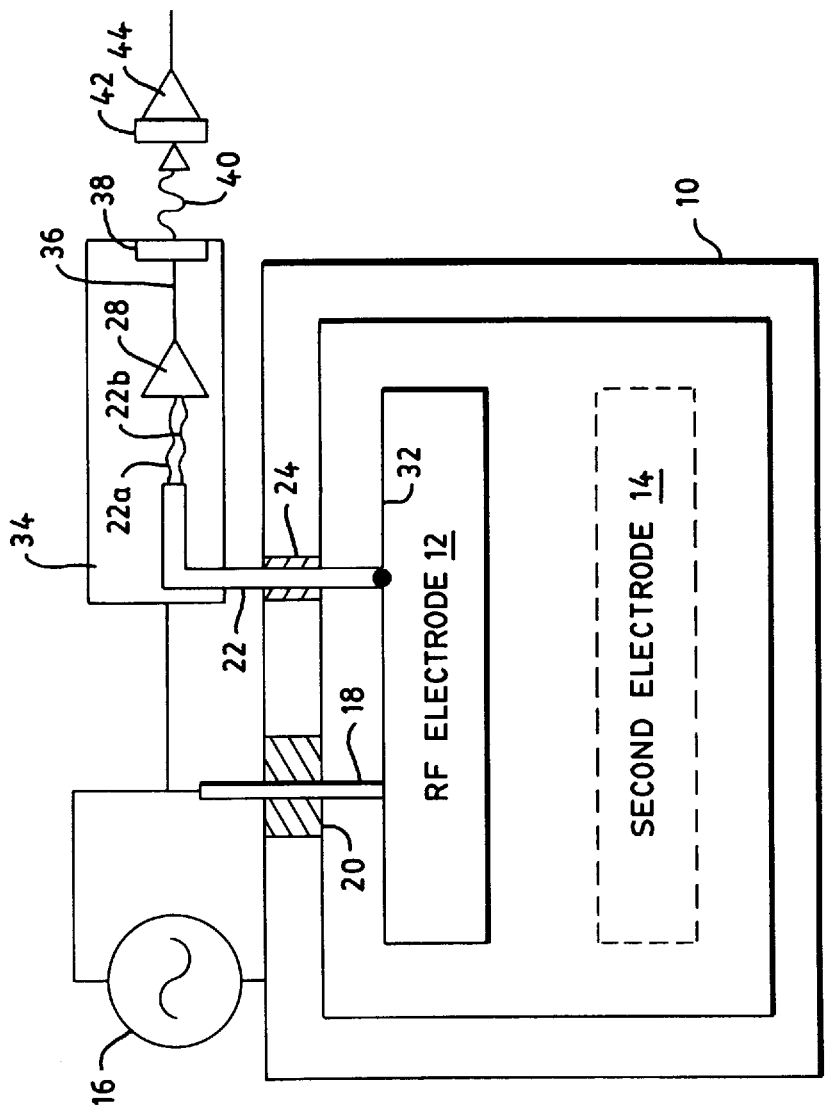
FIG. 2 illustrates another prior art system for measuring the temperatures of an RF electrode with a thermocouple and which includes an optical isolator to isolate thermocouple electronics at RF potential from associated electronics at ground potential.

Certain advantages are realized with the invention. For example, the signal from a thermocouple constructed according to the invention can be brought to substantially ground potential without the use of insulating barriers such as shown in FIG. 1. Further, the illustrated approach provides good thermal conductivity between the thermocouple tip and the electrode. Moreover, unlike the prior art systems of FIGS. 1 and 2, system 100 does not require a separate vacuum feedthrough to interface between the thermocouple and the reactor. Finally, the invention reduces or eliminates the amount of active circuitry which operates at RF potential, unlike the prior art such as shown in FIG. 2.

Figure 4:
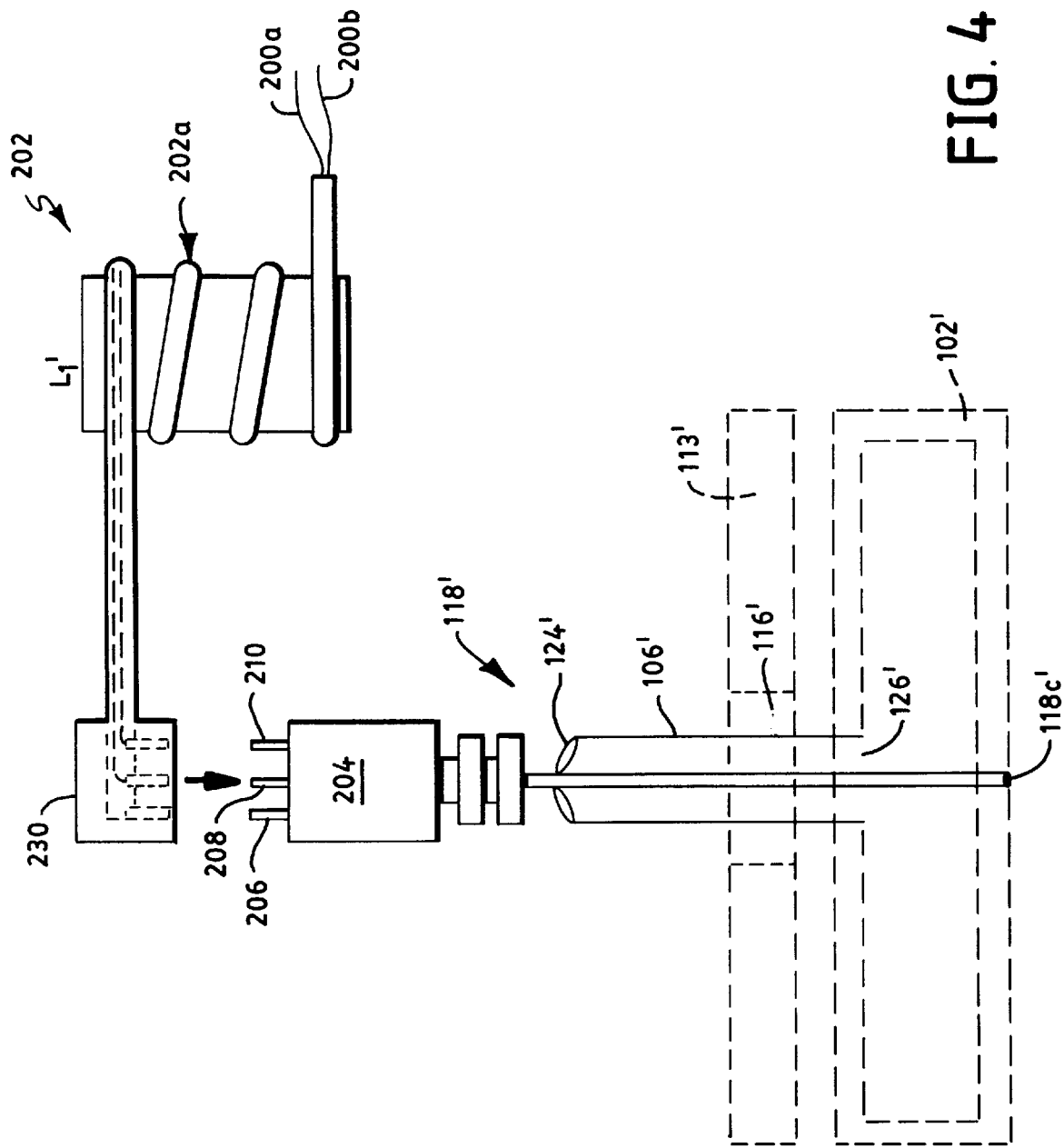
FIG. 4 shows an alternative coil and thermocouple structure as compared to the system of FIG. 3.

FIG. 4 illustrates an alternative thermocouple 118' and associated inductive coil 202, constructed according to the invention. Specifically, the thermocouple 118' is a thermocouple such as model OSK60409/K/U/12/DUAL provided by Omega Engineering, Inc. of Stamford, Conn. This embodiment thus utilizes a three-prong or similar connector 204 that provides at least one ground prong 206 and two signal prongs 208, 210, one for each thermocouple wire 200a, 200b. As above, the sheath 120' of the thermocouple 118' is conductive, and is preferably welded to the RF feedthrough 106' at weld joint 124'. Other structure, such as the reactor walls 113', feedthrough connection point 126', thermocouple end 118c', and RF electrode 102' are shown without supporting structure for ease of illustration.

The mating connector 230 connects to the three-prong connector 204 of the thermocouple 118' to make an electrical connection to the inductive coil 202. In particular, the ground prong 206 of the connector 204 is electrically coupled to the outer conductive surface 202a of the coil 202; and the other prongs 208, 210 are connected to internal wiring, including wires 200a and 200b, which form the circuit for the thermocouple 118'.

Figure 5B:
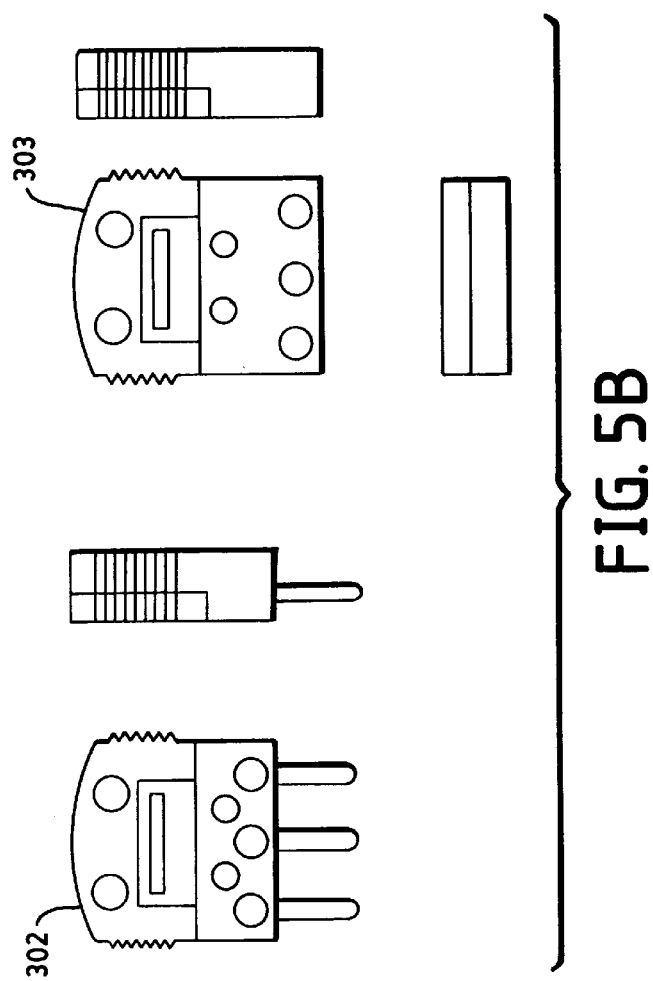
FIGS. 5*a* and 5*b* show schematic views of thermocouples and connectors suitable for use with the invention.
Figure 5A:
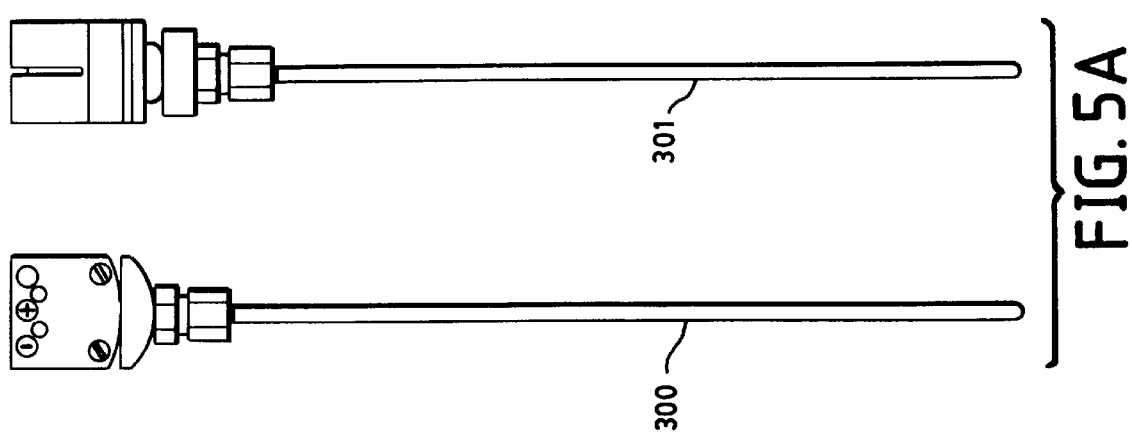

FIGS. 5a illustrates additional detail and connections of thermocouple probes 300 and 301 suitable for use with the invention and similar to the thermocouple 118' of Figure. FIG. 5b illustrates additional detail and connections of three-prong connectors 302, 303 suitable for use with the invention and similar to the connector 204 of FIG. 4.

Figure 6:
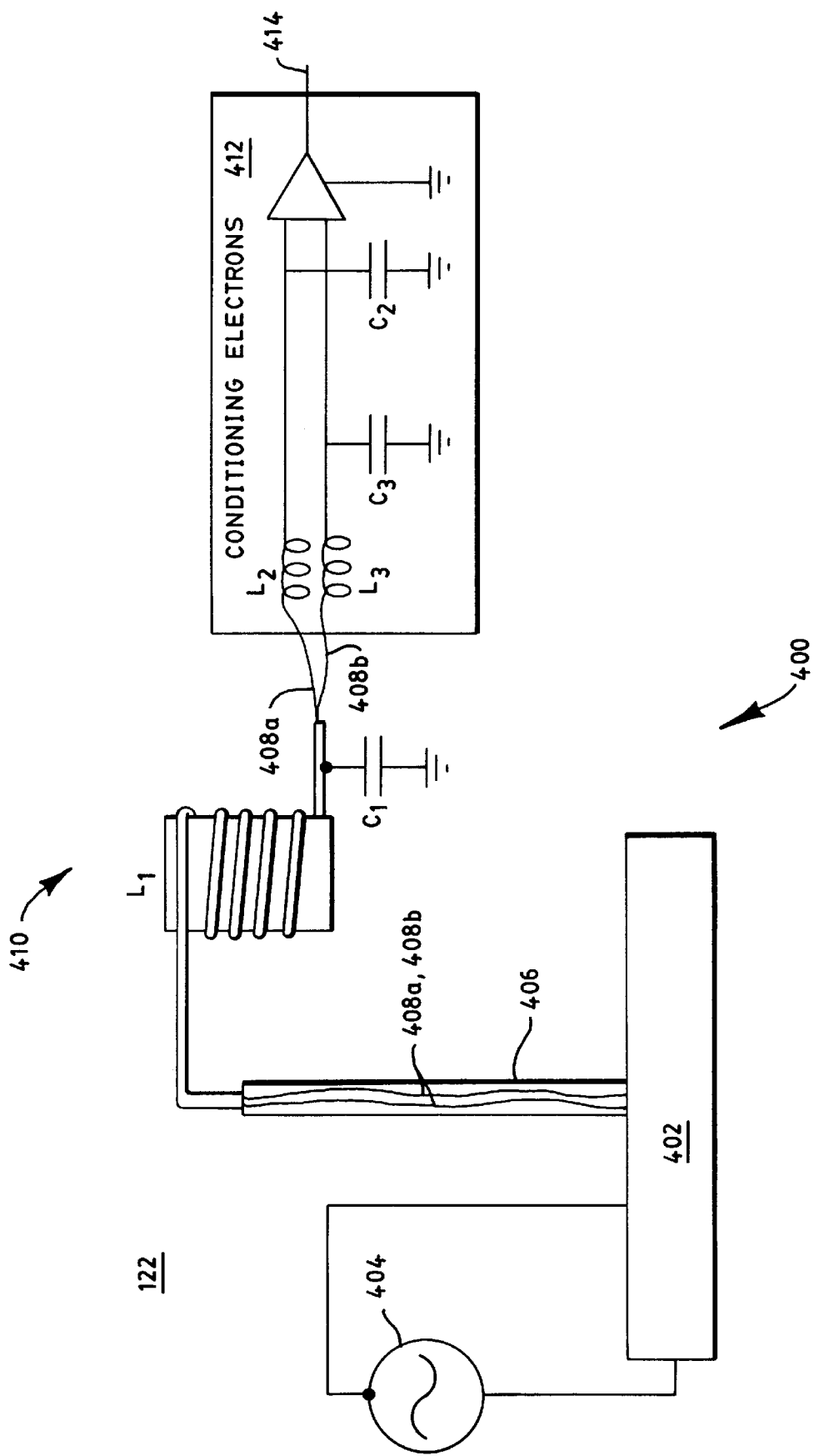
FIG. 6 shows a system, including a thermocouple, constructed according to the invention for measuring temperatures at high potential.

FIG. 6 illustrates a thermocouple system 400 constructed according to the invention and coupled to a structure 402 operating at a radiofrequency potential of greater than about one megahertz. The structure 402 is driven by an RF generator 404. As above, the thermocouple system 400 has a conductive sheath 406 with conductive paths 408a, 408b disposed therein, to provide for sensing of the temperature of the structure 402. Typically, these paths 408a, 408b are wires that extend through the thermocouple sheath 406, through the inductive coil 410, and then out of the sheath 406 for diagnostic testing.

System 400 preferably includes conditioning electronics 412. The signal from the paths 408a, 408b are thus connected to one or more inductors and capacitors $L_i$, $C_i$, in series, to condition the signal and remove residual DC bias voltages. The end of the coil 410 is grounded through capacitance $C_1$, and the paths 408a, 408b are substantially free of RF potentials prior to measurement at point 414. The paths further do not experience current flow therethrough which can heat the paths and contaminate the temperature sensing goals of the thermocouple.

The impedance of the coil 410 is greater than the impedance of the structure 402 and of the capacitor $C_1$. Preferably, the coil's impedance is (a) greater than about ten times the impedance of the capacitor $C_1$, and (b) greater than about ten times the impedance of the structure 402. This arrangement inhibits the flow of RF power from the structure 402, through to the thermocouple sensing paths, and to the diagnostic electronics.

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be said to fall there between.

Having described the invention, what is claimed as new and secured by Letters Patent is:

1. A method for measuring the temperature of a structure at high radiofrequency potential, comprising the steps of:
 encapsulating a thermocouple with an elongated electrically conductive sheath having a first end, the first end being coupled to a first location of the structure having an operating radiofrequency of at least one megahertz, the thermocouple having two electrically conductive paths, each with a different metal, that join at a measurement junction also coupled to the first location, the paths extending through the elongated sheath to provide diagnostic access to the thermocouple at a signal end of the sheath;

forming an inductive coil, using a portion of sheath outside the structure, to produce an inductance at the radiofrequency, the conductive paths being inside the coil;

coupling the sheath to ground potential through a capacitor at a location between the coil and the signal end; and determining the temperature of the structure from a signal provided by the paths at the signal end.

2. A method according to claim 1, further comprising the steps of arranging the sheath within a hollow radiofrequency feedthrough coupled to the structure, and attaching the sheath to the feedthrough to form a vacuum seal.

3. A method according to claim 2, further comprising the step of welding the sheath to the feedthrough.

4. A method according to claim 1, wherein the conductive sheath comprises hastalloy.

5. A method according to claim 1, wherein the step of forming an inductive coil comprises the step of winding the portion of the sheath into the coil.

6. A method according to claim 1, wherein the step of determining the temperature comprises the step of measuring a DC voltage of the signal.

7. A method according to claim 1, wherein the paths comprise a pair of wires, and wherein the thermocouple comprises a three-prong connector, a first prong providing a connection to ground, the second and third prongs being separately connected to one wire, respectively, and wherein the step of forming an inductive coil comprises the steps of connecting the pair of wires to the second and third prongs, separately, and connecting the coil to the first prong so that radiofrequency current flows through sheath and the coil, and so that substantially no radiofrequency current flow through the wires.

8. A method according to claim 7, wherein the step of determining the temperature comprises the step of measuring a DC voltage of the wires at the signal end.

9. A method according to claim 1, wherein the step of determining the temperature comprises the step of filtering the signal to remove residual radiofrequency voltages.

10. A method according to claim 1, wherein the step of determining the temperature of the structure further comprises the step of amplifying the signal with an isolation amplifier to remove DC bias voltages.

11. A method according to claim 1, wherein the step of coupling the sheath to ground potential comprises the step of connecting the sheath to the capacitor that has an impedance less than about one tenth of the impedance of the coil at the radiofrequency.

12. A method according to claim 1, wherein the step of forming an inductive coil further comprises the step of arranging the inductive coil with an impedance that is about ten times greater than the structure's impedance at the radiofrequency.

13. In combination, apparatus for measuring the temperature of a structure at high radiofrequency potential, the combination comprising:

a thermocouple encapsulated within an elongated electrically conductive sheath having a first end, the first end being coupled to a first location of the structure having an operating radiofrequency of at least one megahertz, the thermocouple having two electrically conductive paths, each with a different metal, that join at a measurement junction also coupled to the first location, the paths extending through the elongated sheath to provide diagnostic access to the thermocouple at a signal end of the sheath;

an inductive coil formed with a portion of the sheath outside the structure, the coil producing an inductance at the radiofrequency and generating a magnetic field that is common to the conductive paths;

a capacitor that couples the sheath to ground potential at a location between the coil and the signal end; and means for determining the temperature from a signal provided by the paths at the signal end.

14. Apparatus according to claim 13, wherein the conductive paths are inside the coil.

15. Apparatus according to claim 13, wherein the means for determining the temperature further comprises means for measuring a DC voltage of the signal.

16. Apparatus according to claim 13, further comprising a filter for removing residual radiofrequency voltages from the signal.

17. Apparatus according to claim 13, further comprising an isolation amplifier for amplifying the signal 430 to remove direct current bias voltages.

18. Apparatus according to claim 13, further comprising a hollow radiofrequency feedthrough coupled to the structure, the sheath being disposed within the feedthrough.

19. Apparatus according to claim 18, further comprising a vacuum seal, between the sheath and the feedthrough, formed by welding the sheath to the feedthrough.

20. Apparatus according to claim 18, further comprising a radiofrequency generator for communicating radiofrequency energy through the feedthrough and to the structure, the radiofrequency energy oscillating at the radiofrequency.

21. Apparatus according to claim 18, further comprising a vacuum pump for evacuating the feedthrough to between about 0.1 and 100 Torr.

22. Apparatus according to claim 13, further comprising a radiofrequency generator for communicating radiofrequency energy through the sheath and to the structure, the radiofrequency energy oscillating at the radiofrequency.

23. Apparatus according to claim 13, wherein the capacitor has a capacitance sufficient to create an impedance that is less than about one tenth of the impedance of the coil at the radiofrequency.

24. Apparatus according to claim 13, wherein the coil has an impedance that is greater than about ten times the impedance of the structure at the radiofrequency.

25. Apparatus according to claim 13, wherein the conductive sheath comprises a material selected from the group of stainless steel and hastalloy.

26. Apparatus according to claim 13, wherein the portion of the sheath is wound into a coil, thereby forming the inductive coil.

27. Apparatus according to claim 13, wherein the paths comprise a pair of wires, and wherein the thermocouple comprises a three-prong connector, a first prong providing a connection to ground, the second and third prongs being connected, respectively, to one wire of the pair, and wherein the inductive coil comprises an outer conductor surrounding the wires and being connected to the first prong so that radiofrequency current flows through sheath and the outer conductor, and so that substantially no radiofrequency current flow through the wires.

28. Apparatus according to claim 27, wherein the means for determining the temperature comprises means for determining a DC voltage of the signal.

29. Apparatus according to claim 13, wherein the inductive coil comprises an outer conductor.

* * * * *